United States Patent
Zhang et al.

(10) Patent No.: US 12,471,175 B2
(45) Date of Patent: Nov. 11, 2025

(54) USER EQUIPMENT, BASE STATION, AND METHOD FOR RANDOM ACCESS PROCEDURE ON A PRIMARY SERVING CELL BASED ON A SECONDARY CELL GROUP STATE

(71) Applicant: Sharp Kabushiki Kaisha, Sakai (JP)

(72) Inventors: Chongming Zhang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 312 days.

(21) Appl. No.: 18/266,304

(22) PCT Filed: Dec. 14, 2021

(86) PCT No.: PCT/CN2021/137853
§ 371 (c)(1),
(2) Date: Jun. 9, 2023

(87) PCT Pub. No.: WO2022/127778
PCT Pub. Date: Jun. 23, 2022

(65) Prior Publication Data
US 2024/0032136 A1 Jan. 25, 2024

(30) Foreign Application Priority Data
Dec. 15, 2020 (CN) .......................... 202011479894.9

(51) Int. Cl.
*H04W 76/27* (2018.01)
*H04W 36/00* (2009.01)
*H04W 74/0833* (2024.01)

(52) U.S. Cl.
CPC ....... *H04W 76/27* (2018.02); *H04W 36/0069* (2018.08); *H04W 74/0833* (2013.01)

(58) Field of Classification Search
CPC ............. H04W 76/27; H04W 36/0069; H04W 74/0833; H04W 76/15; H04W 72/20; H04L 5/00; H04L 5/0098
See application file for complete search history.

(56) References Cited

U.S. PATENT DOCUMENTS

| 2020/0359287 A1* | 11/2020 | Zhang | H04W 76/15 |
| 2023/0026279 A1* | 1/2023 | Kumar | H04W 76/19 |

(Continued)

FOREIGN PATENT DOCUMENTS

CN  110324856 A  10/2019

OTHER PUBLICATIONS

Official Communication issued in International Patent Application No. PCT/CN2021/137853, mailed on Mar. 11, 2022.
(Continued)

*Primary Examiner* — Afshawn M Towfighi
(74) *Attorney, Agent, or Firm* — Keating & Bennett, LLP

(57) ABSTRACT

Provided in the present invention are a method performed by user equipment, and user equipment. A method performed by user equipment, in which user equipment (UE) configured with dual connectivity or multi-connectivity performs configuration management on a secondary cell group (SCG) in a deactivated state during communication with a master cell group (MCG) and the SCG, includes the following steps: receiving, by the UE, an RRC connection reconfiguration message transmitted by a base station to the UE, the RRC connection reconfiguration message including a dedicated cell configuration for an SCG and a synchronization indication, wherein the SCG corresponding to the dedicated cell configuration is a target SCG, a primary serving cell (PSCell) thereof is a target PSCell, and an SCG/PSCell serving the UE before the reconfiguration message is received is a source SCG/source PSCell; and performing, by (Continued)

the UE, different PSCell change operations according to different states of the target SCG or the target PSCell.

3 Claims, 1 Drawing Sheet

(56) References Cited

U.S. PATENT DOCUMENTS

2024/0008129 A1\* 1/2024 Pu .......................... H04W 72/12
2024/0214842 A1\* 6/2024 Min ....................... H04W 24/02

OTHER PUBLICATIONS

Ericsson et al., "New WID on DC and CA enhancements (NR_DCCA_Enh)", 3GPP TSG-RAN#80, RP-181469, Jun. 11-14, 2018, 5 pages.

\* cited by examiner

USER EQUIPMENT, BASE STATION, AND METHOD FOR RANDOM ACCESS PROCEDURE ON A PRIMARY SERVING CELL BASED ON A SECONDARY CELL GROUP STATE

TECHNICAL FIELD

The present invention relates to the technical field of wireless communications. More specifically, the present invention relates to a method performed by user equipment, and corresponding user equipment.

BACKGROUNDS

With the rapid growth of mobile communications and great progress of technology, the world will move toward a fully interconnected network society where anyone or anything can acquire information and share data anytime and anywhere. To meet the requirements on enhanced mobile broadband services and the communication requirements on massive Internet of Things terminals, research on new-generation communication technology (5G) was carried out to facilitate technical enhancements for users in dual connectivity and multi-connectivity (RP-181469: New WID on DC and CA enhancements).

Dual connectivity or multi-connectivity means that UE operating in a connected state establishes a physically established wireless connection with more than one network node, and implements data transmission. A master node (MN) and a secondary node (SN) are included. The MN is executed by one Gnb/Enb/ng-eNB. A serving cell group controlled by the MN is referred to as a master cell group (MCG). Correspondingly, the SN is executed by one or more Gnbs/Enbs/ng-eNBs. A serving cell group controlled by the SN is referred to as a secondary cell group (SCG).

UE configured with dual connectivity or multi-connectivity may achieve a high data rate by communicating with the MCG and the SCG. Correspondingly, however, in order to maintain communication with two network nodes, power consumption of the UE is also doubled. To reduce power consumption of the UE, the SCG may be deactivated in a suitable case, such as in the case where communication traffic of the UE is small.

For the SCG in the deactivated state, how to perform configuration management is a problem that needs to be solved.

SUMMARY

Provided in the present invention is a solution to the following problem. That is, a solution is provided as to how to perform configuration management on an SCG in a deactivated state.

An objective of the present invention is to provide a method performed by user equipment and capable of reasonably performing configuration management on an SCG in a deactivated state, and corresponding user equipment.

According to an aspect of the present invention, provided is a method performed by user equipment, in which user equipment (UE) configured with dual connectivity or multi-connectivity performs configuration management on a secondary cell group (SCG) in a deactivated state during communication with a master cell group (MCG) and the SCG, the method comprising the following steps:

receiving, by the UE, an RRC connection reconfiguration message transmitted by a base station to the UE, the RRC connection reconfiguration message including a dedicated cell configuration for an SCG and a synchronization indication, wherein the SCG corresponding to the dedicated cell configuration is a target SCG, a primary serving cell (PSCell) thereof is a target PSCell, and an SCG/PSCell serving the UE before the reconfiguration message is received is a source SCG/source PSCell; and performing, by the UE, different PSCell change operations according to different states of the target SCG or the target PSCell.

In the above method performed by user equipment, preferably, if it is indicated in the reconfiguration information that the state of the target PSCell or the target SCG is an activated state, the UE starts a timer T304, and the UE stops the timer T304 when a random access procedure performed by the UE on the target PSCell is completed successfully;

if it is indicated in the reconfiguration information that the state of the target PSCell or the target SCG is a deactivated state, the UE does not start the timer T304;

if the source SCG is in an activated state, the UE starts the timer T304;

if the source SCG is in a deactivated state, the UE does not start the timer T304.

In the above method performed by user equipment, preferably, the UE performs reconfiguration of sync on the basis of the synchronization indication, thereby achieving a PSCell change or an SCG switch/handover from the source PSCell to the target PSCell.

In the above method performed by user equipment, preferably, after the UE performs the reconfiguration of sync, if the target SCG or the target PSCell is in the activated state, the UE resumes SCG transmission;

after the UE performs the reconfiguration of sync, if the target SCG or the target PSCell is in the deactivated state, the UE does not resume SCG transmission.

In the above method performed by user equipment, preferably, upon receiving an RRC reconfiguration message including the synchronization indication and the dedicated cell configuration for the SCG, the UE triggers the random access procedure performed on the target PSCell;

When the random access procedure is completed successfully:

if the target SCG or the target PSCell is in the activated state, the UE applies a CSI reporting configuration;

if the target SCG or the target PSCell is in the deactivated state, the UE does not apply the CSI reporting configuration, or, when the random access procedure is completed successfully:

if the target SCG or the target PSCell is in the deactivated state, the UE deactivates the SCG, including performing an SCG deactivation operation;

if the target SCG or the target PSCell is in the activated state, the UE does not perform a deactivation operation.

In the above method performed by user equipment, preferably, the state of the target SCG or the target PSCell in the above operation is indicated in the RRC connection reconfiguration message received by a UE, or is learned according to the state of the source SCG or the source PSCell, or is learned according to the state of the source SCG or the source PSCell and an indication in the reconfiguration information.

In the above method performed by user equipment, preferably, the RRC reconfiguration information includes a cell group configuration for the SCG;

the UE performs the cell group configuration for the SCG;

when the above cell group configuration comprises a dedicated cell configuration, the UE configures a dedicated cell;

when the above dedicated cell configuration comprises a dedicated configuration of a dedicated cell, the UE configures the dedicated cell according to the dedicated configuration of the dedicated cell, and a first active downlink bandwidth part identification (BWP-ID) and a first active uplink BWP-ID are configured in the dedicated configuration of the dedicated cell, if the state of the SCG or the PSCell is the activated state, the UE considers that a BWP indicated by the first active downlink BWP-ID is an active downlink BWP, and considers that a BWP indicated by the first active uplink BWP-ID is an active uplink BWP;

if the state of the SCG or the PSCell is the deactivated state, the UE does not perform the above operation.

In the above method performed by user equipment, preferably, when the above SCG in the deactivated state is activated, the UE performs a random access procedure in the above PSCell, and when the random access procedure is completed successfully, the UE considers that the BWP indicated by the first active downlink BWP-ID is an active downlink BWP, and considers that the BWP indicated by the first active uplink BWP-ID is an active uplink BWP.

In the above method performed by user equipment, preferably, the RRC reconfiguration information includes a radio bearer configuration;

UE performs the radio bearer configuration.

According to another aspect of the present invention, user equipment is provided, comprising:

a processor; and a memory storing instructions, wherein the instructions, when run by the processor, cause the user equipment to perform the method described above.

The method performed by user equipment and corresponding user equipment according to the present invention can reasonably perform configuration management on an SCG in a deactivated state.

DETAILED DESCRIPTION

Figure 1:
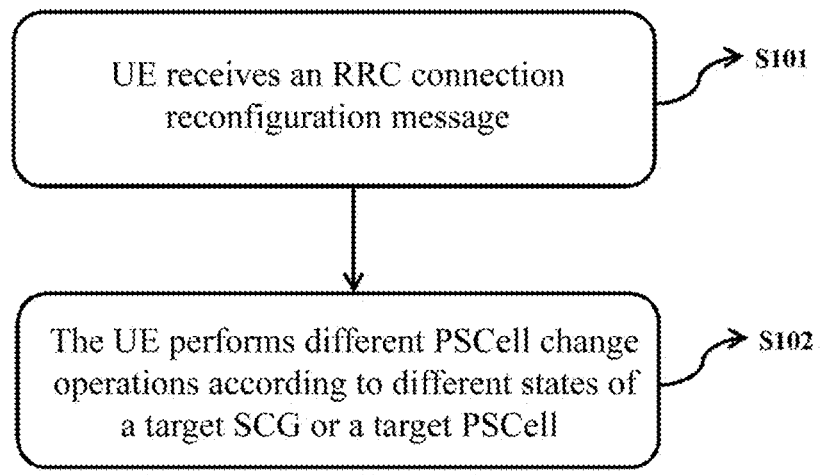
FIG. 1 is a flowchart showing a method performed by user equipment according to an embodiment of the present invention.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment

NR: New Radio eLTE: enhanced Long Term Evolution

E-UTRA: Evolved Universal Terrestrial Radio Access

DC: Dual-Connectivity

MC: Multi-Connectivity

Gnb: a base station node which provides UE with NR user plane and control plane protocol stacks and is connected to a 5G core network Enb: a base station node which provides UE with E-UTRAN user plane and control plane protocol stacks and is connected to an EPC core network Ng-enb: a base station node which provides UE with E-UTRAN user plane and control plane protocol stacks and is connected to a 5G core network SRB: Signaling Radio Bearer DRB: Data Radio Bearer Split SRB: Split Signaling Radio Bearer RLC: Radio Link Control layer PDCP: Packet Data Convergence Protocol layer MAC: Media Access Control layer CSI: Channel State Information Dual connectivity or multi-connectivity means that UE operating in a connected state establishes a physically established wireless connection with more than one network node, and implements data transmission. A master node (MN) and a secondary node (SN) are included.

The MN is executed by one base station, which may be a Gnb that supports 5G technology or an Enb that supports 4G technology, and may also be an ng-eNB that supports connection to a next generation core network (5G core network). A serving cell group controlled by the MN is referred to as a master cell group (MCG). At least one primary serving cell is present, and is referred to as a primary cell (PCell). UE performs radio link monitoring (RLM) on the PCell. If the MCG further includes other cells, then the other cells may be referred to collectively as an Scell. An SRB established between the MN and the UE is commonly referred to as SRB1, and is mainly used to transmit an RRC message between the MN and the UE.

The SN is executed by one base station, which may be a Gnb that supports 5G technology or an Enb that supports 4G technology, and may also be an ng-eNB that supports connection to a next generation core network (5G core network). A serving cell group controlled by the SN is referred to as a secondary cell group (SCG). The SCG at least includes a primary serving cell referred to as a PSCell (Primary Second Cell). The UE performs radio link monitoring on the PSCell. If the SCG further includes other cells, then the other cells may be referred to collectively as an Scell. An SRB may be established between the SN and the UE, and is commonly referred to as SRB3, and is mainly used to transmit an RRC message between the SN and the UE, e.g., an SCG-associated measurement report.

If not specifically indicated otherwise, the special cell (Spcell) may be used to represent the PCell of the MCG and the PSCell of the SCG.

Specific embodiments of the present invention are described in detail below. In addition, as described above, the embodiments of the present invention are exemplary descriptions for facilitating understanding of the present invention, and are not intended to limit the present invention.

Embodiment 1

Provided in this embodiment is a method used by user equipment (UE) configured with dual connectivity or multi-connectivity to perform configuration management on an SCG in a deactivated state during communication with an MCG and the SCG. As shown in FIG. 1, the method includes:

Step S101: receiving, by UE, an RRC connection reconfiguration message transmitted by a base station (e.g., a gNB) to the UE.

RRC connection reconfiguration information transmitted to the UE includes spCellConfig (a dedicated cell configuration) for an SCG and a synchronization indication (reconfigurationWithSync). An SCG corresponding to spCellConfig may be referred to as a target SCG, and a PSCell thereof may be referred to as a target PSCell. Correspondingly, an SCG/PSCell serving the UE before the reconfiguration message is received may be referred to as a source SCG/source PSCell.

Step S102: performing, by the UE, different PSCell change operations according to different states of the target SCG or the target PSCell.

The process may specifically include:

if it is indicated in the reconfiguration information that the state of the target PSCell or the target SCG of the change is an activated state, the UE may start a timer T304, and the UE stops the timer T304 when a random access procedure performed by the UE on the target PSCell is completed successfully. Preferably, the state of the target PSCell or the target SCG may not be indicated in the configuration message, and in this case, it is considered that the state of the PSCell or the target SCG is the activated state.

If it is indicated in the reconfiguration information that the state of the target PSCell or the target SCG of the change is a deactivated state, the UE does not start the timer T304, and optionally, does not perform a random access procedure on the target PSCell.

Another implementation of the above embodiment may be as follows:

The UE receives an RRC reconfiguration message.

If the reconfiguration message includes spCellConfig for the SCG and a synchronization indication (reconfigurationWithSync), and the SCG is in the activated state, the timer T304 is started. In addition, the timer T304 is stopped when a random access procedure performed by the UE on the target PSCell is completed successfully.

If the reconfiguration message includes spCellConfig for the SCG and a synchronization indication (reconfigurationWithSync), and the SCG is in the deactivated state, the UE may not start T304, and optionally, does not perform a random access procedure on the target PSCell.

Embodiment 2

UE receives an RRC connection reconfiguration message transmitted by a gNB to the UE.

RRC connection reconfiguration information transmitted to the UE includes spCellConfig for an SCG and a synchronization indication (reconfigurationWithSync). The SCG corresponding to spCellConfig may be referred to as a target SCG, and a PSCell thereof may be referred to as a target PSCell. Correspondingly, an SCG/PSCell serving the UE before the reconfiguration message is received may be referred to as a source SCG/source PSCell.

The UE performs reconfiguration of sync on the basis of the synchronization indication, thereby achieving a PSCell change or an SCG switch/handover from the source PSCell to the target PSCell. The UE performs different PSCell change operations according to different states of the target SCG or the target PSCell.

For example:

after the UE performs the reconfiguration of sync, if the target SCG or the target PSCell is in the activated state, the UE resumes SCG transmission, or after the UE performs the reconfiguration of sync, if the target SCG or the target PSCell is in the deactivated state, the UE does not resume SCG transmission.

As another example:

upon receiving an RRC reconfiguration message including the synchronization indication (reconfigurationWithSync) and spCellConfig for the SCG, the UE may trigger the random access procedure performed on the target PSCell. When the random access procedure is completed successfully:

if the target SCG or the target PSCell is in the activated state, the UE applies a CSI reporting configuration;

if the target SCG or the target PSCell is in the deactivated state, the UE does not apply the CSI reporting configuration.

As another example:

upon receiving an RRC reconfiguration message including a synchronization indication (reconfigurationWithSync) and spCellConfig for the SCG, the UE may trigger the random access procedure performed on the target PSCell. When the random access procedure is completed successfully:

if the target SCG or the target PSCell is in the deactivated state, the UE deactivates the SCG, specifically including performing an SCG deactivation operation.

Correspondingly, if the target SCG or the target PSCell is in the activated state, the UE does not perform a deactivation operation.

In the above operation, the state of the target SCG or the target PSCell may be indicated in the RRC connection reconfiguration message received by the UE. For example:

it is indicated in the reconfiguration information that the state of the target PSCell or the target SCG of the change is the deactivated state, so that it can be learned that the target SCG or the target Psell is in the deactivated state.

As another example: it is indicated in the reconfiguration information that the state of the target PSCell or the target SCG of the change is the activated state, so that it can be learned that the target SCG or the target Psell is in the activated state. Particularly, the state of the target PSCell or the target SCG of the change may not be indicated in the reconfiguration information, and in this case, it can be considered that the target SCG or the target Psell is in the activated state.

The state of the target SCG or the target PSCell may also be learned according to the state of the source SCG or the source PSCell. For example:

if the state of the source SCG or the source PSCell is the activated state, it can be learned that the target SCG or the target Psell is in the activated state;

if the state of the source SCG or the source PSCell is the deactivated state, it can be learned that the target SCG or the target Psell is in the deactivated state.

Alternatively, the UE may learn that the target SCG or the target Psell is in the activated state according to the state of the source SCG or the source PSCell and an indication in the reconfiguration information. For example, if the state of the source SCG or the source PSCell is the activated state, and indication information in the reconfiguration information indicates that the target SCG learns that the target PSCell is in the activated state, it can be learned that the target SCG or the target Psell is in the activated state;

in particular, if the state of the source SCG or the source PSCell is the activated state, and indication information is not included in the reconfiguration information to indicate the state of the target SCG or the target PSCell, it can be learned that the target SCG or the target Psell is in the activated state;

if the state of the source SCG or the source PSCell is the activated state, and indication information in the reconfiguration information indicates that the target SCG learns that the target PSCell is in the deactivated state, it can be defined that in this case the target SCG or the target Psell is in the activated state, or it can be defined that in this case the target SCG or the target Psell is in the deactivated state;

if the state of the source SCG or the source PSCell is the deactivated state, and indication information in the reconfiguration information indicates that the target SCG learns that the target PSCell is in the deactivated state, it can be learned that the target SCG or the target Psell is in the deactivated state;

if the state of the source SCG or the source PSCell is the deactivated state, and indication information is not included in the reconfiguration information to indicate the state of the target SCG or the target PSCell, it can be defined that in this case the target SCG or the target Psell is in the activated state, or it can be defined that in this case the target SCG or the target Psell is in the deactivated state.

Embodiment 3

UE receives an RRC connection reconfiguration message transmitted by a gNB to the UE.

The RRC reconfiguration information includes a cell group configuration (CellGroupConfig) for an SCG.

The UE performs the cell group configuration for the SCG.

When CellGroupConfig contains/includes spCellConfig, the UE configures an spcell, and for an SCG, the spell refers to a pscell.

When spCellConfig includes a spcell dedicated configuration, the UE configures the Spcell according to the spcell dedicated configuration.

A first active downlink BWP-ID and a first active uplink BWP-ID are configured in the spell dedicated configuration.

If the state of the SCG or the PSCell is an activated state, the UE considers that a BWP indicated by the first active downlink BWP-ID is an active downlink BWP, and considers that a BWP indicated by the first active uplink BWP-ID is an active uplink BWP;

if the state of the SCG or the PSCell is a deactivated state, the UE does not perform the above operation, that is, the UE does not consider that a BWP indicated by the first active downlink BWP-ID is an active downlink BWP, and does not consider that a BWP indicated by the first active uplink BWP-ID is an active uplink BWP.

The SCG or the PSCell here refers to an SCG or a PSCell configured by using cell group configuration information included in the foregoing RRC reconfiguration message.

Regarding determination of the state of the SCG or the PSCell, the state of the SCG or the PSCell may be indicated in the RRC connection reconfiguration message received by the UE, or learned according to the state of the source SCG or the source PSCell, or determined according to both the indication in the RRC connection reconfiguration message received by the UE and the state of the source SCG or the source PSCell, as described in Embodiment 2, or may be determined according to an operating status of the SCG or the PSCell. That is, if the SCG/PSCell is in the deactivated state when the RRC reconfiguration message is received, it can be learned that the SCG/PSCell is in the deactivated state, and if the SCG/PSCell is in the activated state when the RRC reconfiguration message is received, it can be learned that the SCG/PSCell is in the activated state.

The RRC connection reconfiguration message in this embodiment may further include spCellConfig for the SCG mentioned in Embodiment 1 and the synchronization indication (reconfigurationWithSync), and in this case, the aforementioned spcell dedicated configuration may be included in spCellConfig for the SCG, and is applied to configuration of the target SCG or the target Pscell.

The RRC connection reconfiguration message in this embodiment may include the spcell dedicated configuration, but does not include a synchronization indication, and in this case, the spcell dedicated configuration included here is not for the target SCG, but instead is applied to the following SCG:

case one: the UE is not configured with the SCG before receiving the reconfiguration message, so that the spcell dedicated configuration included here is applied to an SCG added for the UE;

case two: the UE has been configured with the SCG before receiving the reconfiguration message, or the configuration of the SCG is already present, so that the spcell dedicated configuration included here is applied to an SCG currently serving the UE or is applied to an existing SCG of the UE.

Embodiment 4

On the basis of Embodiment 3, when the SCG in the deactivated state is activated, the UE performs a random access procedure in the PSCell.

When the random access procedure is completed successfully, the UE considers that a BWP indicated by the first active downlink BWP-ID is an active downlink BWP, and considers that a BWP indicated by the first active uplink BWP-ID is an active uplink BWP.

Here, the SCG may be activated via reception of an SCG activation command. The SCG activation command may be an RRC reconfiguration message. The SCG activation command may also be a MAC CE, e.g., an SCG activation MAC CE. When the UE receives the MAC CE, the UE indicates to an upper layer, e.g., the RRC layer, that the SCG is to be activated, or that the PSCell belonging to the SCG is to be activated. The SCG activation command may also be included in downlink control information (DCI).

Upon receiving an SCG activation instruction or an SCG activation command, an RRC layer performs an activation operation. The activation operation may include performing a random access procedure in the PSCell. In addition, when the random access procedure is completed successfully, the UE considers that a BWP indicated by the first active downlink BWP-ID is an active downlink BWP, and considers that a BWP indicated by the first active uplink BWP-ID is an active uplink BWP. Preferably, when configuration information of the SCG includes the spcell dedicated configuration, the UE considers that a BWP indicated by the first active downlink BWP-ID is an active downlink BWP, and considers that a BWP indicated by the first active uplink BWP-ID is an active uplink BWP.

In particular, when a time advance timer associated with the activated SCG is still running, the UE may not perform the random access procedure in the PSCell. Therefore, it can be considered that when the UE receives an SCG activation instruction or an SCG activation command, and when configuration information of the SCG includes the spcell dedicated configuration, the UE considers that a BWP indicated by the first active downlink BWP-ID is an active downlink BWP, and considers that a BWP indicated by the first active uplink BWP-ID is an active uplink BWP.

Embodiment 5

UE receives an RRC connection reconfiguration message transmitted by a gNB to the UE. The RRC reconfiguration information includes a radio bearer configuration (radio-BearerConfig).

The UE performs the radio bearer configuration.

When radioBearerConfig contains/includes drb-ToAdd-ModList, the UE performs a data radio bearer (DRB) addition or reconfiguration operation.

For the value of DRB-Identity included in drb-ToAdd-ModList, if the value does not belong to the current configuration of the UE, that is, if a DRB corresponding to the value of DRB-identity is not included in DRBs currently configured for the UE, the UE establishes a PDCP entity for the DRB, and informs an upper layer of establishment of the DRB. If the PDCP entity of the DRB is located in the SCG, and if the SCG is in the deactivated state, the DRB is suspended.

A method herein for determining that the SCG is in the deactivated state is as that described in Embodiment 3.

Embodiment 6

When a serving cell is activated, the features thereof are as follows:
  an SRS may be transmitted on the serving cell;
  CSI reporting may be performed for the serving cell (SCell);
  if the serving cell is configured with an uplink channel, then transmission may be performed on the uplink channel (UL-SCH) of the serving cell (SCell);
  if the serving cell is configured with a random access channel, then transmission may be performed on the random access channel (RACH) of the serving cell;
  PDCCH monitoring is performed on the serving cell (SCell);
  PDCCH monitoring is performed for the serving cell (SCell); and
  if the serving cell is configured with a PUCCH, then PUCCH transmission may be performed on the SCell.

It may be considered that a serving cell having the above features may be referred to as an activated cell or a cell in an activated state.

It may be considered that a serving cell having one or a plurality of the above features may be referred to as an activated cell or a cell in an activated state. For the SCG in the activated state or the PScell of the SCG in the activated state mentioned in the foregoing embodiments, the Pscell of the SCG is in the activated state, that is, the Pscell of the SCG has one or a plurality of the above features.

Embodiment 7

When a serving cell is deactivated, the serving cell has at least one or more of the following features:
  no SRS is transmitted on the serving cell (SCell);
  no CSI reporting is performed for the serving cell (SCell);
  no transmission is performed on an uplink channel (UL-SCH) of the serving cell (SCell);
  no transmission is performed on a random channel (RACH) of the serving cell (SCell);
  no PDCCH monitoring is performed on the serving cell (SCell);
  no PDCCH monitoring is performed for the serving cell (SCell); and
  no PUCCH transmission is performed on the serving cell (SCell).

It may be considered that a serving cell having one or a plurality of the above features may be referred to as a deactivated cell or a cell in a deactivated state. For the SCG in the deactivated state or the PScell of the SCG in the deactivated state mentioned in the foregoing embodiments, the Pscell of the SCG is in the deactivated state, that is, the Pscell of the SCG has one or a plurality of the above features.

Figure 2:
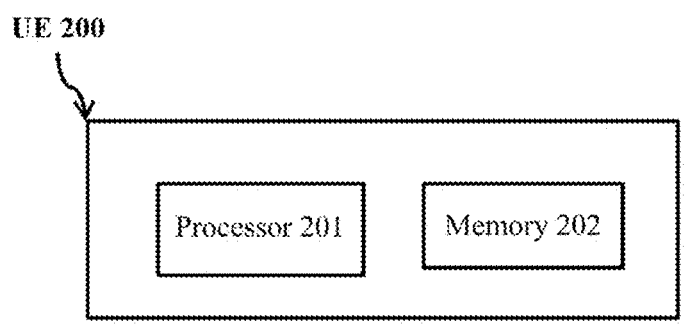
FIG. 2 is a schematic structural block diagram of user equipment according to the present invention.

FIG. 2 is a schematic structural block diagram of user equipment according to the present invention. As shown in FIG. 2, user equipment (UE) 200 includes a processor 201 and a memory 202. The processor 201 may include, for example, a microprocessor, a microcontroller, an embedded processor, and the like. The memory 202 may include, for example, a volatile memory (such as a random access memory (RAM)), a hard disk drive (HDD), a non-volatile memory (such as a flash memory), or other memories. The memory 202 stores program instructions. The instructions, when run by the processor 201, can perform the above method performed by user equipment as described in detail in the present invention.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A user equipment (UE), comprising:
a processor; and
a memory in electronic communication with the processor, wherein instructions stored in the memory are executable to:
receive a Radio Resource Control (RRC) reconfiguration message which includes a special cell (SPcell) configuration for a secondary cell group (SCG) and a synchronization indication (reconfigurationWithSync); and
perform a process upon receiving the RRC reconfiguration message which includes the SPcell configuration for the SCG and the reconfigurationWithSync, wherein,
in a case that a state of the SCG is not indicated in the received RRC reconfiguration message, the UE considers the SCG as activated, starts a timer, and initiates a random access procedure on a primary serving cell (PSCell), and
in a case that the state of the SCG is indicated as deactivated in the received RRC reconfiguration message, the UE completes the process without starting the timer and performing the random access procedure on the PSCell.

2. A control method in a User Equipment (UE), comprising:
receiving a Radio Resource Control (RRC) reconfiguration message which includes a special cell (SPcell) configuration for a secondary cell group (SCG) and a synchronization indication (reconfigurationWithSync); and
performing a process upon receiving the RRC reconfiguration message which includes the SPcell configuration for the SCG and the reconfigurationWithSync, wherein,
in a case that a state of the SCG is not indicated in the received RRC reconfiguration message, the UE considers the SCG as activated, starts a timer, and initiates a random access procedure on a primary serving cell (PSCell), and
in a case that the state of the SCG is indicated as deactivated in the received RRC reconfiguration message, the UE completes the process without starting the timer and performing the random access procedure on the PSCell.

3. A base station apparatus, comprising:
a processor; and
a memory in electronic communication with the processor, wherein instructions stored in the memory are executable to:
transmit a Radio Resource Control (RRC) reconfiguration message which includes a special cell (SPcell) configuration for a secondary cell group (SCG) and a synchronization indication (reconfigurationWithSync), wherein
the RRC reconfiguration message is information that causes a User Equipment (UE) to perform a process, wherein,
in a case that a state of the SCG is not indicated in the RRC reconfiguration message, the UE considers the SCG as activated, starts a timer, and initiates a random access procedure on a primary serving cell (PSCell), and
in a case that the state of the SCG is indicated as deactivated in the RRC reconfiguration message, the UE completes the process without starting the timer and performing the random access procedure on the PSCell.

* * * * *